Patented Apr. 1, 1947

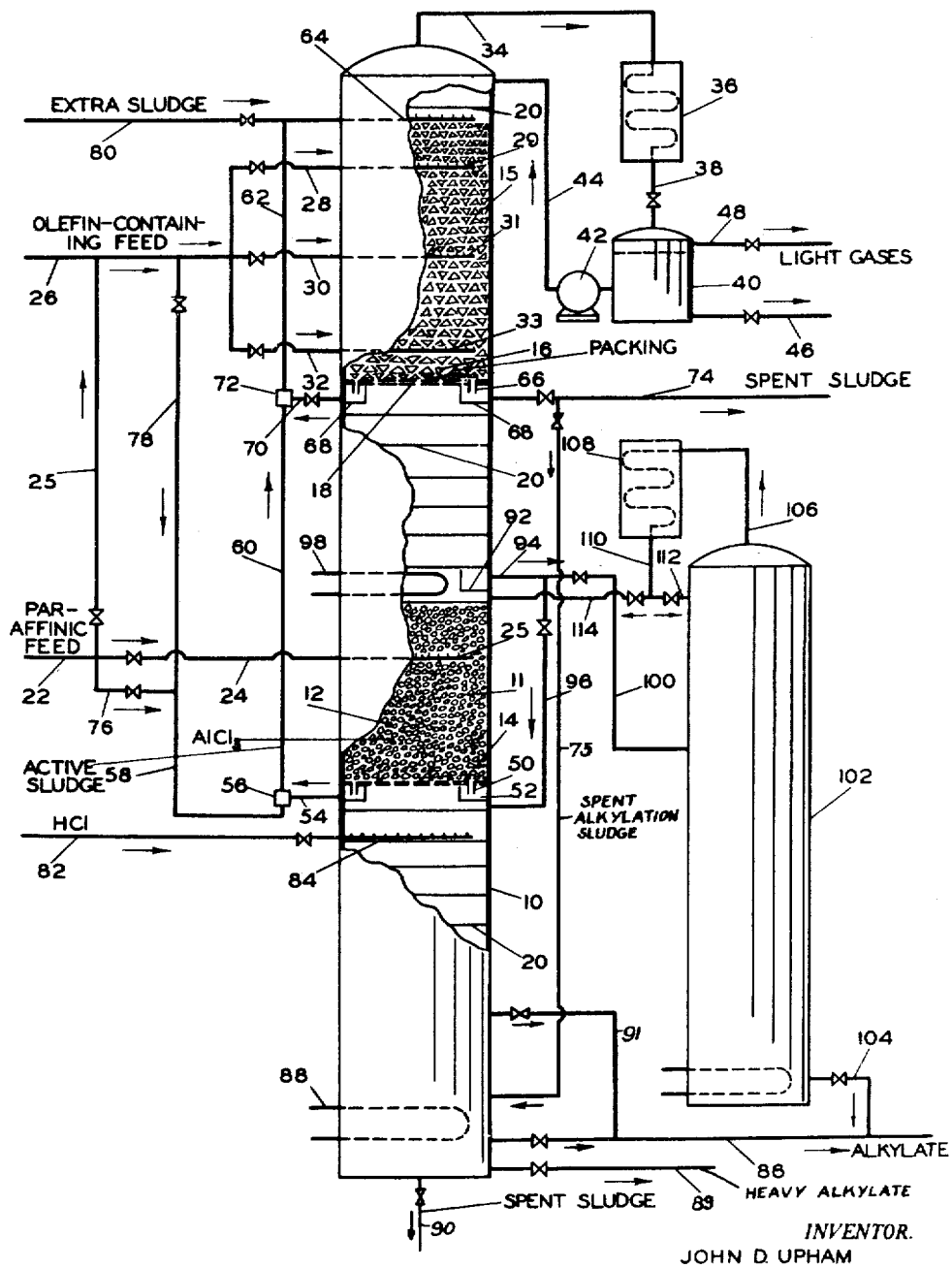

2,418,146

UNITED STATES PATENT OFFICE 2,418,146

CATALYTIC HYDROCARBON CONVERSION

John D. Upham, Bartlesville, Okla., assignor to Phillips Petroleum Company, a corporation of Delaware Application September 13, 1943, Serial No. 502,180

7 Claims. (Cl. 260—683.4)

This invention relates to process and apparatus for the catalytic conversion of hydrocarbons. In particular embodiment it relates to the catalytic conversion of relatively low-boiling paraffins and olefins to high octane-number saturated motor fuel. My invention in preferred modification effects in a unitary manner the isomerization of low-boiling normal paraffins and the alkylation of the resulting isoparaffins with low-boiling olefins, utilizing efficiently the catalytic activity of an active metal halide catalyst for both conversions, while simultaneously effecting separation of reaction mixtures into their various components.

The production of high octane number motor fuels, especially those utilizable as aviation fuels, has become of prime importance in the petroleum industry. Perhaps the most important process for production of components of such fuels is the catalytic alkylation of low-boiling isoparaffins with low-boiling olefins. The sources of isobutane and isopentane, which are the principal isoparaffins used, have proved inadequate, and although large quantities of low-boiling normal paraffins, such as normal butane and normal pentane are available, these normal paraffins are relatively much more difficult to alkylate than their corresponding branched-chain isomers. Accordingy, it has been found desirable to subject the low-boiling normal paraffins, particularly normal butane, to catalytic isomerization to form the isoparaffins, which are then alkylated to produce the desired high octane number branched chain liquid paraffins.

Isomerization is a reversible reaction, and as the thermodynamic equilibrium is approached, the net rate of conversion becomes slower and approaches zero. For example, when the concentration of normal butane in an isomerization zone is from 100 to say 80 or 75 per cent, the reaction proceeds at a rate dependent primarily only on temperature, pressure, contact time, and catalyst activity. However, when the concentration of normal butane decreases toward say 50 or 40 per cent, the composition is approaching equilibrium, so that the ratio of the rate of normal to isobutane conversion to the rate of the reverse reaction, that is iso- to normal butane, decreases greatly. It is an object of this invention to effect the isomerization of normal butane to isobutane, as well as the isomerization of other relatively low-boiling saturated hydrocarbons, under conditions favoring a high concentration of the primary reactant at all times in contact with the catalyst, whereby maximum reaction rates with minimum degradation or other undesired side reactions are realized.

Isomerization of normal paraffins to isoparaffins is an exothermic reaction, and it has heretofore been difficult to remove the exothermic heat of reaction with sufficient rapidity to avoid cracking, sludging of catalyst, and other undesirable effects. It is an object of this invention to carry out an exothermic isomerization reaction at substantially constant temperature conditions by continuous removal of heat of reaction under controlled conditions.

Alkylation is also an exothermic reaction, even more so than isomerization, and heat removal is one of the primary problems in alkylation plant design. The present invention has as an object the effective removal of heat of reaction from an alkylation zone.

It is now well understood that in any alkylation reaction it is required that the ratio of paraffin to olefin must be above 1:1, and preferably at least 10:1, on up to 100:1 or even much higher. This high ratio enables the juncture of paraffin with olefin to predominate over olefin polymerization reactions. This invention attains in a simple manner the object of maintaining any desired ratio of isoparaffin to olefin in the alkylation zone.

Not only should the ratio of isoparaffin reactant to olefin reactant be high in the alkylation zone, but also the products of reaction are preferably present in the reaction zone in only minor amount, and in fact in as low a concentration as is convenient. Otherwise the percentage of alkylate boiling above the motor fuel range is increased, and cracking, deactivation of catalyst, and other phenomena detrimental to the efficient operation of the process appear to an increased extent. Accordingly, an object of this invention is to maintain a very low concentration of alkylate in an alkylation zone through removal of the alkylate immediately upon formation.

Numerous catalysts have been proposed for effecting isomerization of saturated hydrocarbons, and generally these catalysts are also found to be more or less effective in carrying out alkylation reactions. However, the conditions under which the catalysts are used may be different for the two types of reactions, and ordinarily catalysts of different activity, though they may contain the same essential catalytic ingredients, are required for optimum operation of isomerization processes on the one hand and alkylation processes on the other. It is an object of the invention herein disclosed to utilize the same catalyst for isomerizing hydrocarbons and for alkylating the isomerization products, the catalyst being used in each step in a state of activity favorable for the particular step, and differing between the two steps. It is a further object to utilize for alkylation a catalyst no longer efficient for isomerization, thereby attaining important economies and process advantages.

In any hydrocarbon conversion process, such as isomerization or alkylation, it is generally necessary to carry out a preliminary fractionation to segregate suitable charging stocks, and to fractionate reaction effluents to separate desired products, recycle stocks, etc. The present invention accomplishes the object of carrying out one or more of these fractionation steps simultaneously with the conversions involved.

In addition to the objects hereinabove set forth this invention has for another object the accomplishment of all of said objects by operation in a single piece of equipment, whereby the various operations cooperate one with another in a novel and highly advantageous manner. Further objects and advantages of the invention will be apparent, to one skilled in the art, from the accompanying disclosure and discussion.

As discussed above, many catalysts are applicable to both isomerization and alkylation reactions. Perhaps the largest group, and the most important to date, are the active halides of polyvalent metals and metalloids, frequently referred to as Friedel-Crafts type catalysts. Merely by way of example may be mentioned aluminum chloride, aluminum bromide, zinc chloride, ferric chloride, zirconium tetrabromide, boron fluoride, antimony fluoride, tin tetrahalides, etc. While these catalysts may be used to a certain extent interchangeably, it is obvious and is to be understood that one is not necessarily the exact equivalent of another. Frequently two or more of the Friedel-Crafts type catalysts are used in admixture. The catalysts may be used per se, or supported on inert or promoting solid adsorbent supports, or in the form of suspension in liquids, or as complexes with liquid hydrocarbons and other materials, etc. Ordinarily it is either absolutely necessary or at least quite advantageous to utilize a promoting substance with these catalysts. As promotors are generally used substances affording hydrogen halides under the conditions of reaction, such as the hydrogen halides themselves, alkyl halides, water, etc. These various catalysts, as well as others, form liquid sludges upon use, and my invention generally speaking may be practiced with any sludge-forming isomerization catalyst, the sludge of which is active in promoting alkylation reactions. Aluminum chloride may be considered as typical of the catalysts which may be used in carrying out the present invention, and because of its activity and availability it has been utilized to date to a greater extent than other catalysts. Accordingly, the invention will be described with particular reference to anhydrous aluminum chloride, activated with hydrogen chloride, but other catalytic materials may be substituted therefor, with suitable modifications by one skilled in the art cognizant of the varying properties of such materials, in view of the detailed discloseure of general principles and specific operating aspects given herein.

The invention may perhaps be best understood by reference to the accompanying diagrammatic drawing which displays, partially in cross-section and partially in elevation, apparatus, not necessarily drawn to scale, suitable for carrying out the process in preferred form. The operation will be described with particular reference to the isomerization of normal butane to isobutane, and the alkylation of isobutane with olefins such as butylenes to produce a high octane number alkylate comprising primarily branched-chain liquid paraffins. Application of the invention to other charging stocks will be apparent from the disclosure. Various modifications not shown may of course be practiced without departing from the spirit of the invention as disclosed herein and as defined in the accompanying claims.

In the drawing, a single reactor-fractionator 10 is shown in vertical cross-section. Unit 10 contains an isomerization zone 11 charged with granular anhydrous aluminum chloride 12 which may vary in particle size from about 2 to about 6 mesh. The bed of $AlCl_3$ is supported on a perforated Hastelloy screen or plate 14. Inert spacer elements, such as ½" Raschig rings, may be mixed with the aluminum chloride particles if desired to minimize channeling and packing or agglomeration and thus facilitate flow of vapors and liquid therethrough. A manhole or other means (not shown) is provided for periodically charging the isomerization zone with fresh $AlCl_3$. Continuous means may also be utilized for this purpose. Rectification occurs in the bed of $AlCl_3$, for the solid particles serve as excellent contact material, giving intimate contact of vapors with liquid. Reactor-fractionator 10 also contains an alkylation zone 15 which may comprise a packing material 16 such as unglazed ceramic Raschig rings, granular Activated Alumina, etc., supported on a perforated plate 18 made of corrosion-resistant material. Any other means, including mechanical mixing devices, may be utilized in zone 15 to give a very intimate mixture of reactants with the liquid catalyst, which will be described in detail below. Rectification occurs in zone 15, aided by the intimate mixing of gas and liquid. The remaining portions of unit 10 are filled with trays 20 which may be of the conventional bubble-cap type, or any other efficient means for promoting vapor-liquid contact. Rectification occurs on these trays as well as in zones 11 and 15. Isomerization zone 11 is located at the point in the column of highest normal butane concentration. Alkylation zone 15 is located at the point in the column of highest isobutane concentration.

Hydrocarbon feed to the column may come from a single or from two or more sources. For example butane, which may be all normal, all iso, or any mixture thereof, may be charged through line 22 either to zone 11 via line 24 and distributor 25 or to zone 15 via lines 25, 26, and one or more of lines 28, 30, or 32, which terminate in distributor elements 29, 31, and 33, respectively, the exact location of the point or points of introduction being chosen primarily in accordance with the composition of the butane stream. The butane stream may be introduced into any other part of unit 10, but the smoothest operation is attained if it is introduced at the point at which the composition of the fractionator contents corresponds most closely to that of the feed. Olefins, such as one or more butylenes, may be charged through line 26 from any suitable source, and the stream preferably is divided into a plurality of streams which enter the alkylation zone 15 at different points, as through lines 28, 30, and 32 as shown. In the practice of this invention, the olefinic material is always charged only to the alkylation zone, or at least to a point in the fractionator from which it will proceed by rectification to the alkylation zone without contacting in appreciable amount the isomerization zone. Frequently a single source of paraffin and olefin, such as a refinery butane-butene cut, will be available as charge stock, which will then be introduced only through line 26. This mixture may sometimes, however, be supplemented by additional supplies of normal or isobutane, or of butylenes, which may be introduced in any of the ways described.

Normal butane introduced into or produced in the system becomes concentrated in zone 11 by the fractionation occurring in fractionator 10, and is there subjected to the catalytic action of the aluminum chloride isomerization catalyst, whereby isobutane is produced. This isobutane is immediately vaporized and removed from the isomerization zone, which is maintained at about the boiling point of normal butane at the pressure under which the column is operated. This vaporization, together with the constant flow of cold liquid from above into the isomerization zone serves to remove heat of reaction in a very effective manner. The thermal stability of a vapor-liquid system in equilibrium is thus taken advantage of. Immediate and continuous removal of isobutane as formed also serves to prevent its buildup in the isomerization zone, and the high concentration of normal butane thus maintained therein permits maximum reaction rates to obtain at all times insofar as the effect of reactant concentrations on the thermodynamic equilibrium is concerned.

Isobutane thus formed by isomerization makes its way up the column by rectification to the alkylation zone 15, which, as stated above, is located at the region of maximum isobutane concentration. Here this isobutane formed by isomerization, as well as any introduced per se into the system, is alkylated by the introduced olefin through the action of a catalyst to be described below, forming the desired high octane number alkylate which, in the case of isobutane and butylene, is composed primarily of branched chain octanes. By effecting alkylation in this manner within a fractionation system, at the point of maximum isobutane concentration, a very high isoparaffin to olefin ratio is readily realized, giving optimum conditions for alkylation. The thus-formed alkylate is immediately removed from zone 15 by run-down of liquid therefrom, and passes on down the column to the bottom thereof due to its relatively higher boiling point. This immediate removal of alkylate improves catalyst life, minimizes production of heavy alkylate and other side reactions producing less desirable products, and allows maximum rate of alkylation to be attained.

Light gases are continuously taken off overhead from unit 10 via line 34, condensed in cooler 36, and the condensate passed via line 38 to accumulator 40. At least a portion of this condensate is returned by pump 42 and line 44 to the top of the column as reflux liquid. In this manner the fractionation is aided, and the heat of reaction given up both in zone 15 and in zone 11 is finally removed from the system in cooling unit 36. This constant removal of vapors and return of cooled liquid reflux effectively removes the heat of alkylation from zone 15. The material taken off overhead in the system described is largely isobutane, which is present in zone 15 in considerable excess as described heretofore. It is frequently preferred, although not shown in the drawing for the sake of simplicity, to admix at least a portion of the cooled liquid reflux comprising isobutane with the olefinic material in line 26 for introduction into alkylation zone 15. This provides more efficient cooling directly within the zone, and decreases the olefin concentration at the point or points of introduction of the feed, thus minimizing polymerization and favoring the alkylation reaction. If the supply of olefins is limited, or if for any reason it is desired to produce a net excess of isobutane in the process, such excess may be recovered from accumulator 40 through line 46. Excess light gases, such as propane and lighter hydrocarbons and/or hydrogen formed as by-products in or introduced into the process, and which also may comprise hydrogen chloride or other catalyst activator introduced as hereinafter described, may be removed from accumulator 40 through line 48, and any component or portion thereof may be recovered and reintroduced into the system as desired.

As the isomerization proceeds in zone 11 by contact of liquid and gaseous normal butane with the solid $AlCl_3$ activated with HCl, a liquid sludge is formed which is relatively inactive as an isomerization catalyst but which is an excellent alkylation catalyst. This sludge may comprise aluminum chloride-hydrocarbon complexes, and appears to contain considerable free or uncombined $AlCl_3$ dissolved therein. This sludge, which is ordinarily either discarded or used in an inefficient attempt to catalyze more isomerization reaction, is in the present invention transferred to the alkylation zone 15, wherein it catalyzes the alkylation reaction in a very active manner. While the transfer of sludge from one zone to the other may be accomplished in any suitable way, a preferred method is shown in the drawing. The sludge as it forms drains down from the lumps of $AlCl_3$ and through down-pipes 50 into trapout tray 52. From tray 52 it flows via line 54 into a venturi or other type of injector 56 which operates in a manner well known to those skilled in the art. Any suitable gas or liquid, preferably feed hydrocarbons, is introduced via line 58, and serves to carry the sludge by gas-lift or entrainment upward through lines 60 and 62 into distributor 64 which serves to distribute the sludge over the packing material 16 in alkylation zone 15. The sludge passes by gravity over the packing upon which it presents a large surface area for contact with the reactants. Sludge is withdrawn from the bottom of zone 15 through downpipes 66 into trapout tray 68, from which a portion is generally recycled to the top of the packing via line 70, injector 72, and line 62 so that its catalytic activity may be more completely utilized, while another portion is withdrawn from the system via line 74 as spent sludge, which may be discarded or treated for recovery of any $AlCl_3$ remaining therein. The last catalytic activity of this sludge may in some cases be utilized if the bottom section of unit 10 is operated to give a light alkylate sidestream and heavy alkylate kettle product, by flowing the spent alkylation sludge from tray 68 via line 76 to the kettle where, at the relatively high temperature conditions prevailing, heavy alkylate may be catalytically cracked to recover more lighter products. Depending upon the amount of normal butane to be isomerized relative to the amount of alkylation to be effected, it may be required to introduce a supplemental quantity of active sludge into the system, for which purpose line 80 is provided. Such extra sludge may come from any source, and may, for example, be prepared by mixing and/or reacting powdered aluminum chloride with heavy alkylate or other liquid hydrocarbons.

In the preferred method of circulating the sludge as just described, a relatively small portion of the charge stock is used. If a paraffinic feed is being introduced to the system through line 22, a portion of this is diverted through line 76 to line 58. However, if only a mixed feed is available, a portion is passed from line 26 through lines 78 and 58 to serve as lifting medium for the sludge. As stated, such lifting medium may be either gaseous or liquid, and a vaporizer (not shown) may be interposed in line 58 if desired. This method of handling the catalytic sludge is quite simple and economical, and avoids the necessity of employing mechanical devices, or of introducing extraneous material into the system.

Anhydrous gaseous hydrogen chloride, which is the preferred catalyst activator for use with aluminum chloride, is preferably introduced via line 82 into unit 10 at a point just below isomerization zone 11. Distributor means 84 may be used to ensure even distribution of the HCl in the reaction mixtures. The thus-introduced HCl passes up through the column and the two reaction zones largely in the gas phase, but partly dissolved in the liquid phase. As stated hereinabove the HCl is taken off overhead, and is preferably recycled from line 48 to line 82 by means not shown, with or without intermediate purification as required. The amount of HCl introduced to the column is such that it comprises say from about 0.5 to 10 or 15 per cent of the reactants present in the reaction zones. In case a lower concentration of HCl is desired in alkylation zone 15, this may be provided for in a number of different ways. A preferred method (not shown in the drawing to avoid confusion) is to withdraw vapor phase from a point below zone 15 and scrub the same with liquid butane, pentane, or light alkylate cut, which selectively dissolves the HCl; the thus-scrubbed vapors are returned to the column at a point just above the point of withdrawal, while the liquid hydrocarbon scrubbing medium containing dissolved HCl is introduced into the column at a point within or below isomerization zone 11, according to its composition.

Alkylate formed as described above descends through the column, and after stabilization in the lower portion thereof is recovered, generally as kettle product, through line 86. Heater 88 is provided in the kettle to furnish sufficient heat for the stripping of butane from the alkylate and any additional heat required for the efficient operation of the fractionator over that supplied by the exothermic isomerization and alkylation reactions. A single butane-free alkylate product may be recovered, or the alkylate may be separated into two or more fractions as desired either in unit 10 or in a separate fractionator. Generally a heavy alkylate comprising hydrocarbons boiling above aviation gasoline endpoint, say 350° F., is separated via line 89 from the bulk of the product and used in ordinary motor fuel or otherwise; the main portion of the alkylate boiling up to said end point is in such a case recovered via lines 91 and 86, and being of high octane number, is suitable for use as a blending component of 100 octane or other aviation fuel.

A certain amount of aluminum chloride is removed from zone 11 by solution in liquid hydrocarbons flowing downwardly therefrom. Some of this is carried back up by volatilization, but most of it sludges out due to the relatively high temperatures prevailing in the lower portions of unit 10. Such sludge is removed from the bottom through line 90, but the amount of $AlCl_3$ carried out in this manner is quite small and causes no difficulties.

Flow of alkylate from zone 15 down through isomerization zone 11 increases the rate of catalyst sludging in zone 11 and decreases the alkylate yield slightly, and if this is deemed undesirable it may be avoided, as by by-passing the zone. For this purpose trapout tray 92 may be provided, from which liquid may be removed through line 94. This liquid, which comprises mainly normal butane and alkylate, along with some isobutane, is passed via line 96 to a point just below zone 11. This by-passing of liquid requires either the use of a cooling coil 98 or the introduction of a cool stream of liquid normal butane to furnish reflux for zone 11. Alternately, although sometimes less advantageously, liquid may be passed from trapout tray 92 through lines 94 and 100 to a separate fractionator 102 from which alkylate is recovered as bottoms via lines 104 and 86, while lighter material, predominantly normal butane, is taken off overhead through line 106, condensed in cooler 108, and passed via line 110 partially to the top of column 102 via line 112 as reflux, and partially through line 114 to unit 10 at a point just below its point of removal therefrom. It will be understood that the use of trapout tray 92 and the related operations just described is optional, and will depend on the particular feed and reaction conditions being utilized in a given conversion system.

The process and apparatus of the present invention may be used to advantage even when the only butane charged is isobutane. This may be illustrated by taking a specific example, such as the manufacture of diisopropyl by alkylation of isobutane with ethylene. In this case particularly, a fairly active catalyst is used in the alkylation zone to ensure effective reaction of ethylene with the isobutane. A certain amount of "reverse" isomerazation, that is formation of normal butane from isobutane, takes place, the extent being dependent on the activity of the alkylation catalyst, occurring to a lesser yet substantial degree with less active catalysts such as those derived from an isomerization reaction. Provision of an isomerization catalyst within the fractionating system at the point at which normal butane becomes concentrated serves to re-form isobutane therefrom which returns to the alkylation zone. In this manner build-up of normal butane in the system is avoided.

In order to illustrate one type of operation and the results obtainable therefrom, the following example is given; however, since many other examples differing in one or more respects might also be given, the invention is not to be considered as being unduly limited thereby. A $C_4$ refinery cut containing about 10 mol per cent isobutane, 45 mol per cent normal butane, and 45 mol per cent total butenes, is fed to several points in the upper part of the alkylation zone of a reactor-fractionator similar to that shown in the drawing. Granular anhydrous aluminum chloride of 2 to 10 mesh particle size is disposed in the lower isomerization zone, while the upper alkylation zone is filled with 1-inch unglazed ceramic Raschig rings. Gaseous hydrogen chloride is used as activator. The top temperature of the column is maintained at about 100° F., while the kettle temperature is about 300° F. The reflux ratio is quite high, generally above about 50 to 1, since considerable cooling is required, while only a small quantity of material lighter than $C_4$ is taken off overhead. A hydrocarbon trapout tray is not provided above the isomerization zone, the alkylate produced being allowed to flow downwardly through the isomerization zone. This causes increased sludging of the isomerization catalyst, which however, is not objectionable since the amount of sludge formed is still somewhat below that required for the alkylation reaction. The remainder of the sludge required for the alkylation is made up from aluminum chloride and heavy alkylate. Near-theoretical yields of 85 octane number alkylate boiling in the aviation fuel range are obtained, about 10 per cent of the charge being lost as heavy alkylate (which is blended into motor fuel), light gases, and sludge.

While the invention has been described with particular reference to normal butane and butylenes, the principals are equally applicable, with suitable modifications apparent to one skilled in the art, to other low-boiling normally gaseous or liquid paraffinic and olefinic hydrocarbons.

I claim:

1. A process for the production of high octane number branched-chain normally liquid hydrocarbons suitable as aviation fuel components which comprises providing within a single vertical fractional distillation column a stripping section at a low point thereof, a higher isomerization zone containing a permeable bed of lump anhydrous aluminum chloride isomerization catalyst, and a yet higher alkylation zone containing a permeable bed of solid contact particles, said isomerization and alkylation zones including respectively the point of maximum normal butane concentration and the point of maximum isobutane concentration, maintaining temperature and pressure conditions throughout said column to effect fractional distillation therein and to effect isomerization in said isomerization zone and alkylation in said alkylation zone, introducing a low-boiling olefin into said alkylation zone, introducing normal butane into said column in an amount to provide at least sufficient isobutane to react with said olefin by alkylation, withdrawing active aluminum chloride sludge from said isomerization zone and passing same upwardly by entrainment in a portion of the feed hydrocarbons and discharging the same at a point above said bed of contact particles for flow downwardly thereover as the active alkylation catalyst, withdrawing spent sludge from said alkylation zone, providing a concentration of hydrogen chloride in said isomerization zone and in said alkylation zone effective to promote said catalysts, isomerizing said normal butane in said isomerization zone to form isobutane, causing thus-formed isobutane to pass upwardly by vaporization and rectification in said column to said alkylation zone, alkylating thus-formed isobutane with said olefin in said alkylation zone, causing resulting alkylate to flow downwardly in said column to said stripping section, vaporizing unreacted normal butane from alkylate in said stripping section and returning said vapors to said isomerization zone, maintaining a high isobutane-olefin ratio in said alkylation zone, withdrawing light gases overhead from said column, cooling and condensing same and returning condensate to the top of said column as reflux to aid said fractionation and to remove heat of isomerization and heat of alkylation, and withdrawing from said stripping section of said column a stabilized normally liquid hydrocarbon fraction comprising branched-chain saturated hydrocarbons formed by said alkylation.

2. A process according to claim 1 in which said olefin is a butene.

3. A process according to claim 1 in which said olefin is ethylene.

4. A process according to claim 1 in which a mixed $C_4$ cut containing butane and butenes is charged to the process.

5. A process according to claim 1 in which down-flowing alkylate-containing liquid is withdrawn from said column at a point above said isomerization zone and returned at a point below said isomerization zone, and an alkylate-free reflux is supplied to said isomerization zone, whereby contact of alkylate with said isomerization catalyst is avoided.

6. A process according to claim 1 in which said spent sludge withdrawn from said alkylation zone is passed to contact with heavy alkylate in the bottom of said column to crack same and further utilize any catalytic activity of said sludge.

7. A process for the production of high octane number branched-chain normally liquid hydrocarbons suitable as aviation fuel components which comprises providing within a single vertical fractional distillation column a stripping section at a low point thereof, a higher isomerization zone containing a permeable bed of lump anhydrous Friedel-Crafts type metal halide isomerization catalyst, and a yet higher alkylation zone containing a permeable bed of solid contact particles, said isomerization and alkylation zones including respectively the point of maximum normal paraffin concentration and the point of maximum isoparaffin concentration, maintaining temperature and pressure conditions throughout said column to effect fractional distillation therein and to effect isomerization in said isomerization zone and alkylation in said alkylation zone, introducing a low-boiling olefin into said alkylation zone, introducing low-boiling normal paraffin into said column in an amount to provide at least sufficient isoparaffin to react with said olefin by alkylation, withdrawing active metal halide sludge from said isomerization zone and passing same upwardly by entrainment in a portion of the feed hydrocarbons and discharging the same at a point above said bed of contact particles for flow downwardly thereover as the active alkylation catalyst, withdrawing spent sludge from said alkylation zone, providing a concentration of promoter in said isomerization zone and in said alkylation zone effective to promote said catalysts, isomerizing said normal paraffin in said isomerization zone to form isoparaffin, causing thus-formed isoparaffin to pass upwardly by vaporization and rectification in said column to said alkylation zone, alkylating thus-formed isoparaffin with said olefin in said alkylation zone, causing resulting alkylate to flow downwardly in said column to said stripping section, vaporizing unreacted normal paraffin from alkylate in said stripping section and returning said vapors to said isomerization zone, maintaining a high isoparaffin-olefin ratio in said alkylation zone, withdrawing light gases overhead from said column, cooling and condensing same and returning condensate to the top of said column as reflux to aid said fractionation and to remove heat of isomerization and heat of alkylation, and withdrawing from said stripping section of said column a stabilized normaly liquid hydrocarbon fraction comprising branched-chain saturated hydrocarbons formed by said alkylation.

JOHN D. UPHAM.

REFERENCES CITED

The following references are of record in the file of this patent:

UNITED STATES PATENTS

| Number | Name | Date |
|---|---|---|
| 2,330,206 | Dryer | Sept. 28, 1943 |
| 2,313,661 | Montgomery | Mar. 9, 1943 |
| 2,303,663 | Shankland | Dec. 1, 1942 |
| 2,316,775 | Egloff | Apr. 20, 1943 |
| 2,354,652 | Carmody et al. | Aug. 1, 1944 |
| 2,361,368 | Evering et al. | Oct. 31, 1944 |
| 2,293,241 | Campbell | Aug. 18, 1942 |
| 1,427,626 | Owen | Aug. 29, 1922 |
| 1,952,694 | Watson | Mar. 27, 1934 |

Certificate of Correction

Patent No. 2,418,146.  April 1, 1947.

JOHN D. UPHAM

It is hereby certified that errors appear in the printed specification of the above numbered patent requiring correction as follows: Column 3, line 71, for "discloseure" read *disclosure*; column 4, line 36, for "Activated Alumina" read *activated alumina*; line 65, strike out the word "stream"; column 8, line 48, for "isomerazation" read *isomerization*; column 11, line 3, for "normaly" read *normally*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.* and to remove heat of isomerization and heat of alkylation, and withdrawing from said stripping section of said column a stabilized normaly liquid hydrocarbon fraction comprising branched-chain saturated hydrocarbons formed by said alkylation.

JOHN D. UPHAM.

REFERENCES CITED

The following references are of record in the file of this patent:

UNITED STATES PATENTS

| Number | Name | Date |
| --- | --- | --- |
| 2,330,206 | Dryer | Sept. 28, 1943 |
| 2,313,661 | Montgomery | Mar. 9, 1943 |
| 2,303,663 | Shankland | Dec. 1, 1942 |
| 2,316,775 | Egloff | Apr. 20, 1943 |
| 2,354,652 | Carmody et al. | Aug. 1, 1944 |
| 2,361,368 | Evering et al. | Oct. 31, 1944 |
| 2,293,241 | Campbell | Aug. 18, 1942 |
| 1,427,626 | Owen | Aug. 29, 1922 |
| 1,952,694 | Watson | Mar. 27, 1934 |

Certificate of Correction

Patent No. 2,418,146. April 1, 1947.

JOHN D. UPHAM

It is hereby certified that errors appear in the printed specification of the above numbered patent requiring correction as follows: Column 3, line 71, for "discloseure" read *disclosure*; column 4, line 36, for "Activated Alumina" read *activated alumina*; line 65, strike out the word "stream"; column 8, line 48, for "isomerazation" read *isomerization*; column 11, line 3, for "normaly" read *normally*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.*